Sept. 22, 1925.
J. M. COOTE
BUMPER
Filed April 19, 1924
1,554,955
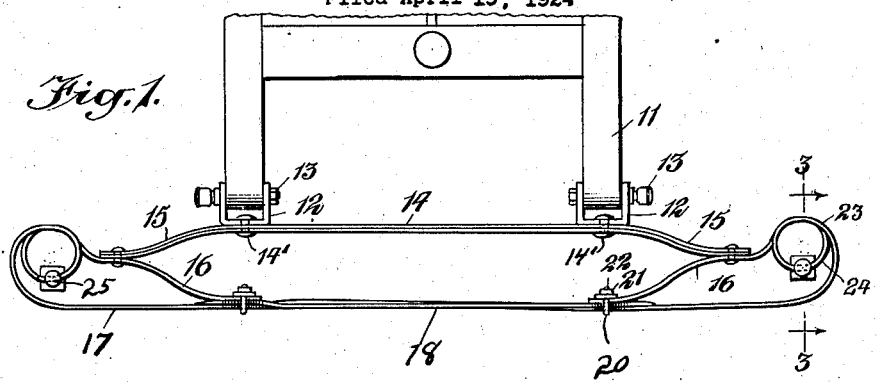
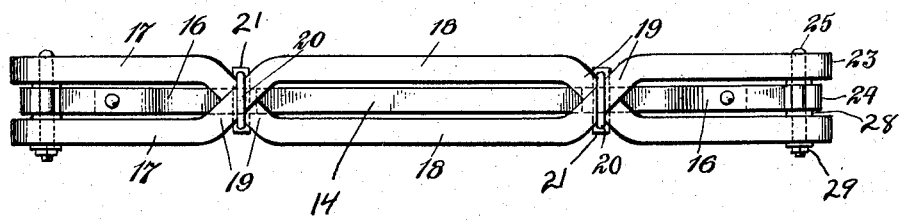
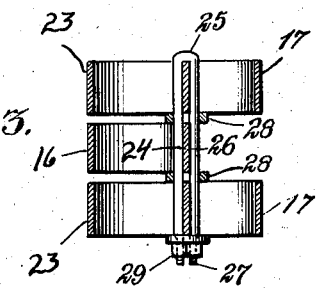
INVENTOR
John M Coote
BY
Dean, Fairbank, Albright & Hirsch
ATTORNEYS Patented Sept. 22, 1925.

1,554,955

UNITED STATES PATENT OFFICE.

JOHN M. COOTE, OF ELIZABETH, NEW JERSEY, ASSIGNOR TO COOTE PRODUCTS CORPORATION, OF NEW YORK, N. Y., A CORPORATION OF NEW YORK.

BUMPER.

Application filed April 19, 1924. Serial No. 707,556.

*To all whom it may concern:*

Be it known that I, JOHN M. COOTE, a citizen of the United States, and resident of Elizabeth, in the county of Union and State of New Jersey, have invented certain new and useful Improvements in Bumpers, of which the following is a specification.

The present invention is an improvement in bumpers, having an impact member and a supporting frame member and it embodies a novel construction of terminals and connections for said members. An object of the invention is to so connect the ends of the impact member with the ends of the supporting frame member that the bumper will combine unusual resiliency with great strength.

In carrying out my invention, the ends of the impact bar or bars and the ends of the supporting frame member or members are oppositely curved or bent inwardly to cross each other and connected to form a closed loop. The coupling members for their extremities preferably give a rigid, rather than a pivotal connection.

By means of my improved construction, direct bending strains on the impact and frame members are in part transmitted to the coiled connected ends, so that these ends function much in the manner of opposed convolute springs, winding and unwinding to absorb and resist the shocks of impact. Furthermore, these end connections permit considerable yielding laterally of the vehicle to end strains or thrusts on the bumper without danger of injury to the parts or shearing off the bolts by which is it connected to the chassis.

In the accompanying drawing, Fig. 1 is a top plan view of my improved bumper, and certain parts of the vehicle frame;

Fig. 2 is a view in front elevation of the bumper.

Fig. 3 is a sectional view on a larger scale on the line 3—3 of Fig. 1.

The bumper is adapted to be secured to any suitable part of the chassis, as for instance the spring horns 11, and by any suitable attaching means, as for instance, a pair of substantially U-shaped brackets 12, straddling the forward ends of the spring horns and secured thereto by bolts 13.

The bumper includes a rear or supporting part and an impact part. The former is shown as including a main horizontal member 14, connected to the brackets 12, by bolts or similar securing devices 14', and may comprise a flat bar of spring metal or a pair of such bars arranged in laminated relationship. The ends 15 of the rear member 14, which extend laterally beyond the spring horns 11, are curved slightly forwardly and are bolted or otherwise secured adjacent their extremities to the intermediate portions of shorter frame bars 16, also formed of flat bar stock, and serving to directly support the impact member.

The impact member shown is of the general character described and claimed in my prior Patent No. 1,441,400, of January 9, 1923, and includes a pair of flat bar members 17, 17, cooperating to provide a relatively wide impact face. The bars are spaced apart and arranged in edge to edge relationship. The horizontal planes of their intermediate portions 18 and their end portions are transposed by crossing the bars at two points. Preferably the crossing occurs directly ahead of each spring horn 11. In other words, each bar includes an offset intermediate portion 18 located in the horizontal plane of the ends of the other bar. The crossed portions 19 of the bars are secured together by U-bolts 20 straddling both bars and having their extremities passed through plates or keepers 21 and secured by nuts 22.

The inner forward ends of the supporting members 16 are slidingly held between the keepers and the rear faces of the crossed portions 19 of the bars 17. It is not essential to use any particular kind of securing device, but it is desirable that it be of a character to permit sliding interconnection of the forward inner ends of the bars 16 with the impact member.

The vertical distance between the two impact bars 17, is slightly greater than the width of a single bar, so that the ends of the bars 17 can conveniently accommodate between them the ends of the bars 16.

The shape, arrangement and manner of connection of the extremities of the bars 17 and 16 constitute the essence of the present invention. The ends 23 of the impact bars 17 are bent or curved rearwardly into substantially convolute form, the radius of curvature preferably progressively decreasing toward the extremities which are in a plane substantially parallel to the vertical plane of the intermediate portion of the impact member. The outer ends 24 of the bars 16 are curved rearwardly and then forwardly and inwardly into approximately semi-convolute form and are disposed between the ends 23 of the bars 17 in superimposed edge to edge relationship.

For connecting these superposed terminal portions, I preferably employ slotted bolts or studs 25, which rigidly, rather than pivotally connect the parts. The bolt in the form shown is provided with a slot 26, extending lengthwise thereof from the threaded end 27, nearly to the opposite end which may be rounded or provided with any suitable form of head. The slot is of a width substantially equal to the thickness of the bar ends 23 and 24 and the bolt is of such length as to receive these three bar ends in superposed relationship and in the same vertical plane. Washers 28 are interposed between the bar ends 23 and 24 around the slotted stud bolts, and nuts 29, screwed onto the lower ends of the bolts firmly clamp the washers between the bar ends and force the upper bar ends into the top of the slots 26.

As seen most clearly in Fig. 1, the oppositely curved ends 23 and 24 of the bar members 16 and 17 cross each other and are rigidly secured to the bolts 25 at points within the outer curved ends of the bumper. In other words, the bar ends 23 and 24 cooperate to form a closed loop one wall of which is defined by the outer curved ends of the bumper.

The coiled or convolute connected bar ends provide great resiliency without detracting from the inherent strength of the bumper. The sliding movement of the forward inner ends of the bars 16 behind the crossed portions 19 of the bars 17 permits considerable lateral play when the bumper receives an end thrust or impact. They likewise permit some of the force of the impact to be transmitted through the bars 17 from one end of the bumper to the other, thus utilizing both coiled bumper ends to resist and absorb the jar. The danger of shearing off the bolts 14', or the bolts connecting the bar ends 15 with the bars 16 is consequently minimized.

A direct impact on the front of the bumper tends to unwind the ends 24 of the bars 17, but such unwinding is resisted and opposed by the coiled ends of the bars 16. I find that this shock absorbing action is much more efficient if the bar ends 23, 24 are rigidly, instead of loosely, coupled to the bolts 25, but in some cases I might use other forms of connecting means. In case of a direct impact on the front part of the bumper, the inherent resiliency of the intermediate portions of the impact members, the curved ends of the frame bar 14 and the inner forward ends of the bars 16 aid in resisting the strain on the connected coiled ends 23, 24.

While I have illustrated a preferred embodiment of the invention, it will be evident that numerous structural changes and alterations might be made without departing from the spirit or scope of the appended claims.

Having thus described my invention, what I claim as new and desire to secure by Letters Patent is:

1. A bumper, including an impact member and supporting means therefor, including oppositely curved, crossed ends rigidly connected to a common coupling member.

2. A bumper, including an impact member and supporting frame members cooperating to provide a curved impact surface at each end of the bumper, coupling bolts disposed within the curved ends of the bumper rigidly connecting the ends of the frame members and the impact member.

3. In a bumper, an impact member and a supporting frame, including oppositely curved substantially convolute ends and securing devices rigidly coupling said ends.

4. A bumper, including an impact member, a pair of supporting frame members each having one end rigidly connected to the impact member and one end slidably connected thereto, a bar adapted to be supported upon a vehicle and including curved ends secured to the intermediate portions of the frame members.

5. A bumper including an impact member, a pair of supporting frame members each connected at one end to the intermediate portion of the impact member, the impact member and the other ends of the frame members being oppositely curved into substantially convolute form and crossing each other, and means for rigidly connecting the crossed oppositely curved ends of the frame member and impact member.

6. A bumper, including an impact member and a supporting frame, the ends of said impact member and supporting frame being oppositely curved into substantially convolute form and intercrossed, means rigidly connecting the intercrossed curved ends of the impact member and frame member, one of said members including a pair of bars between which the end of the other member is received.

7. A bumper, including an impact member and a supporting frame, the ends of said impact member and supporting frame being oppositely curved into substantially convolute form and intercrossed, means rigidly connecting the intercrossed curved ends of the impact member and frame member, said impact member including a pair of spaced bars, and said frame member including a single bar received between and connected to the spaced bars.

8. A bumper including an impact member having each of its terminal portions curved to form substantially one complete turn of a spiral with the end of the member spaced in the rear of the body portion of the member, and means engaging with said ends to support the impact member, said terminal portions being resilient to permit rearward, forward, or endwise movement of the body portion of the impact member in respect to said supporting means.

Signed at New York, in the county of New York and State of New York this 10th day of April, A. D. 1924.

JOHN M. COOTE.